US012340535B2

(12) United States Patent
Meier et al.

(10) Patent No.: US 12,340,535 B2
(45) Date of Patent: Jun. 24, 2025

(54) 6D POSE AND SHAPE ESTIMATION METHOD

(71) Applicant: TOYOTA MOTOR EUROPE, Brussels (BE)

(72) Inventors: Sven Meier, Brussels (BE); Norimasa Kobori, Brussels (BE); Luca Minciullo, Brussels (BE); Kei Yoshikawa, Brussels (BE); Fabian Manhardt, Munich (DE); Manuel Nickel, Munich (DE); Nassir Navab, Munich (DE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 17/801,077

(22) PCT Filed: Feb. 21, 2020

(86) PCT No.: PCT/EP2020/054664
§ 371 (c)(1),
(2) Date: Aug. 19, 2022

(87) PCT Pub. No.: WO2021/164887
PCT Pub. Date: Aug. 26, 2021

(65) Prior Publication Data
US 2023/0080133 A1    Mar. 16, 2023

(51) Int. Cl.
*G06T 7/73* (2017.01)
*B60W 10/04* (2006.01)
(Continued)

(52) U.S. Cl.
CPC ............... *G06T 7/73* (2017.01); *B60W 10/04* (2013.01); *B60W 10/18* (2013.01); *B60W 10/20* (2013.01);
(Continued)

(58) Field of Classification Search
USPC ............................................. 382/103
See application file for complete search history.

(56) References Cited

U.S. PATENT DOCUMENTS 10,242,036 B2 *   3/2019   Kwon .................... G06F 18/254
2017/0046616 A1 *   2/2017   Socher ................... G06V 10/82
(Continued)

OTHER PUBLICATIONS

Manhardt et al., "ROI-10D: Monocular Lifting of 2D Detection to 6D Pose and Metric Shape", Dec. 6, 2018, pp. 1-15, arXiv:1812.02781v1 (Year: 2018).*
(Continued)

*Primary Examiner* — Chineyere Wills-Burns
*Assistant Examiner* — Aaron Timothy Bonansinga
(74) *Attorney, Agent, or Firm* — Dinsmore & Shohl LLP

(57) ABSTRACT

A computer-implemented method of estimating a 6D pose and shape of one or more objects from a 2D image, comprises the steps of: detecting, within the 2D image, one or more 2D regions of interest, each 2D region of interest containing a corresponding object among the one of more objects; cropping out a corresponding pixel value array, coordinate tensor, and feature map for each 2D region of interest; concatenating the corresponding pixel value array, coordinate tensor, and feature map for each 2D region of interest; and inferring, for each 2D region of interest, a 4D quaternion describing a rotation of the corresponding object in the 3D rotation group, a 2D centroid, which is a projection of a 3D translation of the corresponding object onto a plane of the 2D image given a camera matrix associated to the 2D image, a distance from a viewpoint of the 2D image to the corresponding object, a size, and a class-specific latent shape vector of the corresponding object.

20 Claims, 4 Drawing Sheets

(51) Int. Cl.
| | |
|---|---|
| *B60W 10/18* | (2012.01) |
| *B60W 10/20* | (2006.01) |
| *B60W 30/09* | (2012.01) |
| *B60W 60/00* | (2020.01) |
| *G05D 3/12* | (2006.01) |
| *G06T 1/00* | (2006.01) |
| *G06T 7/50* | (2017.01) |
| *G06T 17/20* | (2006.01) |
| *G06V 10/25* | (2022.01) |
| *G06V 10/26* | (2022.01) |
| *G06V 10/764* | (2022.01) |
| *G06V 10/766* | (2022.01) |
| *G06V 10/77* | (2022.01) |
| *G06V 10/82* | (2022.01) |
| *G08G 1/16* | (2006.01) |

(52) U.S. Cl.
CPC ........ *B60W 30/09* (2013.01); *B60W 60/0015* (2020.02); *G05D 3/12* (2013.01); *G06T 1/0014* (2013.01); *G06T 7/50* (2017.01); *G06T 17/205* (2013.01); *G06V 10/25* (2022.01); *G06V 10/267* (2022.01); *G06V 10/764* (2022.01); *G06V 10/766* (2022.01); *G06V 10/7715* (2022.01); *G06V 10/82* (2022.01); *G08G 1/165* (2013.01); *G08G 1/166* (2013.01); *B60W 2420/403* (2013.01); *B60W 2554/20* (2020.02); *B60W 2554/4029* (2020.02); *G06T 2200/08* (2013.01); *G06T 2207/10024* (2013.01); *G06T 2207/10028* (2013.01); *G06T 2207/20068* (2013.01); *G06T 2207/20084* (2013.01); *G06T 2207/30252* (2013.01)

(56) References Cited

U.S. PATENT DOCUMENTS

| | | | | |
|---|---|---|---|---|
| 2019/0266387 | A1* | 8/2019 | Sun | G06V 40/171 |
| 2019/0304134 | A1* | 10/2019 | Mauchly | G06T 15/20 |
| 2019/0311488 | A1* | 10/2019 | Sareen | G06T 7/60 |
| 2019/0340432 | A1* | 11/2019 | Mousavian | G06T 7/50 |
| 2019/0363118 | A1* | 11/2019 | Berkovich | H04N 25/40 |
| 2020/0027269 | A1* | 1/2020 | Jiang | G06T 17/10 |
| 2020/0193213 | A1* | 6/2020 | Cao | G06N 3/08 |
| 2020/0361083 | A1* | 11/2020 | Mousavian | G06N 3/063 |

OTHER PUBLICATIONS

Lin et al., "Focal Loss for Dense Object Detection", Feb. 7, 2018, pp. 412-446, arXiv:1708.02002v2 [cs.CV] (Year: 2018).*

Xu et al., "Multi-Level Fusion Based 3D Object Detection From Monocular Images", Jun. 18-23, 2018, pp. 2345-2353, IEEE/CVF Conference on Computer Vision and Pattern Recognition, doi: 10.1109/CVPR.2018.00249 (Year: 2018).*

Xiang et al., "PoseCNN: A Convolutional Neural Network for 6D Object Pose Estimation in Cluttered Scenes", May 26, 2018, pp. 1-10, arXiv:1711.00199v3 [cs.CV] (Year: 2018).*

Manhardt et al., "ROI-10D: Monocular Lifting of 2D Detection to 6D Pose and Metric Shape", Dec. 6, 2018, pp. 1-15, arXiv:1812.02781v1 (Year: 2018) (Year: 2018).*

Lin et al., "Focal Loss for Dense Object Detection", Feb. 7, 2018, pp. 412-446, arXiv:1708.02002v2 [cs.CV] (Year: 2018) (Year: 2018).*

Xu et al., "Multi-Level Fusion Based 3D Object Detection From Monocular Images", Jun. 18-23, 2018, pp. 2345-2353, IEEE/CVF Conference on Computer Vision and Pattern Recognition, doi: 10.1109/CVPR.2018.00249 (Year: 2018) (Year: 2018).*

Xiang et al., "PoseCNN: A Convolutional Neural Network for 6D Object Pose Estimation in Cluttered Scenes", May 26, 2018, pp. 1-10, arXiv:1711.00199v3 [cs.CV] (Year: 2018) (Year: 2018).*

Manhardt Fabian et al: ROI-10D: Monocular Lifting of 2D Detection to 6D Pose and Metric Shape11 , 2019 IEEE/CVF Conference on Computer Vision and Pattern Recognition (CVPR). IEEE, Jun. 15, 2019 (Jun. 15, 2019), pp. 2064-2073, XP033686715, DOI: 10.1109/CVPR.2019.00217 [retrieved on Jan. 8, 2020] abstract figures 1,2 sections 1,3.1,3.2,3.3.

Simonelli Andrea et al: "Disentangling Monocular 3D Object Detection", 2019 IEEE/CVF International Conference on Computer Vision (ICCV), IEEE, Oct. 27, 2019 (Oct. 27, 2019), pp. 1991-1999, XP033723806, [retrieved on Feb. 24, 2020] the whole document.

Redmon, Joseph, You Only Look Once:Unified, Real-Time Object Detection University of Washington_, Allen Institute for AI†, Facebook AI Research University of Washington_, http://pjreddie.com/yolo/.

He, Kaiming, Mask R-CNN, Jan. 24, 2018; 12 pages; https://github.com/ facebookresearch/Detectron.

Liu, Mei; SSD: Single Shot MultiBox Detector, Dec. 29, 2016, 17 pages.

Mercier, Jean-Philippe et al., Learning Object Localization and 6D Pose Estimation from Simulation and Weakly Labeled Real Images, Feb. 21, 2019, 7 pages.

Chen, Xiaozhi, Monocular 3D Object Detection for Autonomous Driving; Tsinghua.edu.cn; 10 pages.

Chen, Xiaozhi, Multi-View 3D Object Detection Network for Autonomous Driving; Tsinghua.edu.cn; 9 pages.

Song, Shuran, Deep Sliding Shapes for Amodal 3D Object Detection in RGB-D Images, <http://dss.cs.princeton.edu>, 10 pages.

Gupta, Saurabh, Aligning 3D Models to RGB-D Images of Cluttered Scenes, 1UC Berkeley. 2Universidad de los Andes, Colombia. 3Microsoft Research, 1 page.

Kehl, Wadim, SSD-6D: Making RGB-Based 3D Detection and 6D Pose Estimation Great Again, <https://wadimkehl.github.io/>, Nov. 27, 2017, 9 pages.

Manhardt, Fabian, Explaining the Ambiguity of Object Detection and 6D Pose From Visual Data, arXiv:1812.00287v2 [cs.CV] Aug. 20, 2019, 22 pages.

International Search Report dated Oct. 29, 2020; International Application No. PCT/EP2020/054664.

* cited by examiner

＃ 6D POSE AND SHAPE ESTIMATION METHOD

CROSS-REFERENCE TO RELATED APPLICATION

This application is a National Stage Entry under 35 U.S.C. § 371 of International Patent Application No. PCT/EP2020/054664, filed on Feb. 21, 2020, which is incorporated herein by reference in its entirety.

TECHNICAL FIELD

The disclosure relates to the field of image recognition, and in particular to 6D pose and shape estimation based on a 2D image.

BACKGROUND

The field of 2D object detection has made tremendous leaps forward with the advent of deep learning. Current state-of-the-art 2D detectors, such as those disclosed by J. Redmon et al in "You only look once: Unified, real-time object detection", CVPR, 2016, by W. Liu et al in "SSD: Single shot multibox detector", ECCV, or by K. He et al in "Mask R-CNN" ICCV, 2017, can robustly detect more than a hundred different object classes in real-time. Progress in the fields of 3D object detection and 6D pose estimation, however, is still limited. This is, at least in part, attributable to the higher complexity of these tasks.

The complexity of 3D object detection and 6D pose estimation is compounded with the much higher effort in annotating datasets. As a consequence, many approaches rely on synthetic training data. This, however, introduces an additional domain gap, which has a detrimental impact on performance, as noted by J.-P. Mercier et al in "Learning object localization and 6d pose estimation from simulation and weakly labeled real images", 2019 International Conference on Robotics and Automation (ICRA), pages 3500-3506. IEEE, 2019. Furthermore, many factors such as clutter and occlusion, ambiguities, and lighting changes can significantly deteriorate performance.

Finally, the ability to accurately estimate 3D or 6D poses of previously unseen objects is currently poor and often ignored in performance reports. Existing methods typically train separate networks for each object instance to be detected, which is slow and inflexible.

Recently, a few approaches have been proposed to extend 3D object detection to object classes. These are typically tailored towards automotive contexts for detection and estimation of 3D bounding boxes around vehicles and people in outdoor environments. The problem these approaches target is somewhat constrained by the size of the objects, e.g. cars and people, the data available, e.g. requiring LiDAR and the problem of pose estimation itself. Assuming all objects rest on the ground plane, many applications in this field restrict the output to 3D bounding boxes, whose only degree of freedom is rotation around the Y-axis, see for instance X. Chen et al, "Monocular 3d object detection for autonomous driving", CVPR, 2016, and X. Chen et al, "Multi-view 3d object detection network for autonomous driving", CVPR, 2017. A couple of approaches for category level 3D object detection in indoor environments have also been proposed by S. Song and J. Xiao in "Deep sliding shapes for amodal 3d object detection in RGB-D images", CVPR, 2016, and by S. Gupta et al in "Aligning 3D models to RGB-D images of cluttered scenes", Proceedings of the IEEE Conference on Computer Vision and Pattern Recognition, pages 4731-4740, 2015.

In the field of robotics, where one of the applications is grasping and manipulation, estimating 3D bounding boxes is insufficient. This task also imposes different constraints: Objects are often physically smaller as well as appearing smaller in the image, data is frequently available only in the form of color images which lack depth information and the ground-plane assumption is many times unrealistic. As a consequence, 6D pose estimation, that is, the estimation of both position and orientation in 3D space, is required instead of 3D detection. Due to the increase in degrees of freedom, this task is significantly more complex.

W. Kehl et al, in "SSD-6D: Making RGB-Based 3D Detection and 6D Pose Estimation Great Again", arXiv: 1711.10006v1, 27 Nov. 2017, and F. Manhardt et al in "Explaining the Ambiguity of Object Detection and 6D Pose From Visual Data", ICCV, 2019, disclosed methods for detecting specific 3D model instances and estimating their 6D poses from RGB data. However, these methods required learning of specific object instances and could not be applied for entire object classes.

F. Manhardt et al, in "ROI-10D: Monocular Lifting of 2D Detection to 6D Pose and Metric Shape", arXiv: 1812.02781v3, 10 Apr. 2019, have presented a deep learning method for end-to-end monocular 3D object detection and metric shape retrieval.

SUMMARY

A first object of the disclosure is that of estimating 3D position, orientation and shape of one or more objects based on a simple, monocular 2D image. In particular, a more accurate estimation of the shape is sought with fewer processing resources, for example for manipulator applications.

For this purpose, according to a first aspect of the disclosure, a computer-implemented method of estimating 3D position, orientation and shape of one or more objects from a 2D image comprises the steps of detecting, within the 2D image, one or more 2D regions of interest, cropping out a corresponding pixel value array, coordinate tensor, and feature map for each 2D region of interest, concatenating the corresponding pixel value array, coordinate tensor, and feature map for each 2D region of interest, and inferring, for each 2D region of interest, a 4D quaternion, a 2D centroid, a distance, a size, and a class-specific latent shape vector of a corresponding object contained within the 2D region of interest, wherein the 4D quaternion describes a rotation of the corresponding object in the 3D rotation group, the 2D centroid is a projection of a 3D translation of the corresponding object onto a plane of the 2D image given a camera matrix associated to the 2D image, and the distance is a distance from a viewpoint of the 2D image to the corresponding object.

Cropping out the corresponding pixel value array and feature map for each 2D region of interest facilitates and greatly reduces the resources needed for the subsequent inference of the 4D quaternion, 2D centroid, distance, size and class-specific latent shape vector, which i.a. allows using individual artificial neural networks for each object class. In turn, cropping out a corresponding coordinate tensor for each 2D region of interest containing a corresponding object and concatenating this cropped corresponding coordinate tensor with the cropped corresponding pixel value array and feature map provides an indication of the source location of the 2D region for the subsequent inference.

To further facilitate and speed up this subsequent inference, the step of cropping out a corresponding pixel value array, coordinate tensor, and feature map for each 2D region of interest may also comprise resizing them into a uniform array size, for instance a square array size, and in particular a 32×32 array size.

To estimate the 3D position of the corresponding object, the method may further comprise a step of back projecting the 2D centroid using the distance from the viewpoint and the camera matrix to compute the 3D translation. In this case, the 4D quaternion may describe the rotation in an allocentric projection space and the method may further comprise a step of computing an egocentric rotation using the allocentric rotation and the 3D translation. Since allocentric projection is translation invariant, this can simplify the learning of artificial neural networks performing the inference of the 4D quaternion, 2D centroid, distance, size and shape encoding.

The class-specific latent shape vector may represent an offset from a mean latent shape of a corresponding object class, and the method method may further comprise the step of adding the class-specific latent shape vector to the mean latent shape of the corresponding object class to obtain an absolute shape vector of the corresponding object. An unscaled 3D point cloud of the corresponding object may in particular be reconstructed from the absolute shape vector using a separately trained decoder neural network. Using the shape offset and a separately trained decoder allows the reconstruction of a 3D model from just a few shape parameters, without divergence out of a shape encoder space.

The method may further comprise a step of scaling the unscaled 3D point cloud, using the inferred size, to obtain a scaled 3D point cloud of the corresponding object. It may then further comprise a step of meshing the scaled 3D point cloud to generate a triangle mesh of the scaled 3D shape, and steps of merging mesh triangles of the triangle mesh, using a ball pivoting algorithm, to fill any remaining hole in the triangle mesh, and/or applying a Laplacian filter to the triangle mesh to generate a smoothed scaled 3D shape of the corresponding object, in order to generate a more realistic representation of the corresponding object.

The one or more 2D regions of interest may be detected within the 2D image using a feature pyramid network. The method may then comprise a step of classifying each 2D region of interest using a fully convolutional neural network attached to each level of the feature pyramid network and/or a step of regressing a boundary of each 2D region of interest towards the corresponding object using another fully convolutional neural network attached to each level of the feature pyramid network. Through these steps, it is not only possible to determine boundaries of the one or more regions of interest that closely fit each corresponding object, but also to generate a meaningful feature map of the 2D image, from which the corresponding feature map for each 2D region of interest may be cropped in the subsequent step.

The step of inferring, for each 2D region of interest, the 4D quaternion, 2D centroid, distance, size, and class-specific latent shape vector of the corresponding object may be carried out using a separate neural network for each one of the 4D quaternion, 2D centroid, distance, size, and class-specific latent shape vector. In particular, each separate neural network for inferring the 4D quaternion, 2D centroid, distance, size, and class-specific latent shape vector may comprise multiple 2D convolution layers, each followed by a batch normalization layer and a rectified linear unit activation layer, and a fully-connected layer at the end of the separate neural network. More specifically, each one of the separate neural networks for inferring the 4D quaternion and distance comprises four 2D convolution layers followed each by a batch normalization layer and a rectified linear unit activation layer, whereas each one of the separate neural networks for inferring the 2D centroid, size and class-specific latent shape vector may comprise only two 2D convolution layers followed each by a batch normalization layer and a rectified linear unit activation layer. However, different and even lower numbers of layers may be envisaged.

The 2D image may be in the form of a pixel array with at least one value, such as an intensity value, for each pixel. More specifically, the pixel array may have an intensity value for each of three colors for each pixel.

A second aspect of the present disclosure relates to a tracking method wherein 3D position, orientation and shape of one or more objects is estimated, from each 2D image in a sequence of successive 2D images, according to the abovementioned computer-implemented method of estimating 3D position, orientation and shape of one or more objects from a 2D image, for example for surveillance applications.

A third aspect of the present disclosure relates to a computer program for carrying out the abovementioned computer-implemented method of estimating 3D position, orientation and shape of one or more objects from a 2D image when executed by a computer system.

A fourth aspect of the present disclosure relates to a data processing device programmed to carry out the computer-implemented method of estimating 3D position, orientation and shape of one or more objects from a 2D image.

A fifth aspect of the present disclosure relates to a system comprising the data processing device programmed to carry out the computer-implemented method of estimating 3D position, orientation and shape of one or more objects from a 2D image, and an imaging device connected to input the 2D image to the data processing device.

The system may further comprise a robotic manipulator connected to the data processing device, and the data processing device be also programmed to control the manipulator based on the estimated 3D position, orientation and shape of each object in the 2D image, for example for handling the objects and/or working with them using the robotic manipulator.

Alternatively or additionally to the robotic manipulator, the system may further comprise propulsion, steering and/or braking devices, and the data processing device be also programmed to control and/or assist control of the propulsion, steering and/or braking devices based on the estimated 3D position, orientation and shape of each object in the 2D image, for example for collision prevention in autonomous driving or driving assistance.

The above summary is not intended to describe each disclosed embodiment or every implementation of the present disclosure. In particular, selected features of any illustrative embodiment within this specification may be incorporated into an additional embodiment unless clearly stated to the contrary.

BRIEF DESCRIPTION OF THE DRAWINGS

The present disclosure may be more completely understood in consideration of the following detailed description of various embodiments in connection with the accompanying drawings, in which.

Figure 1:
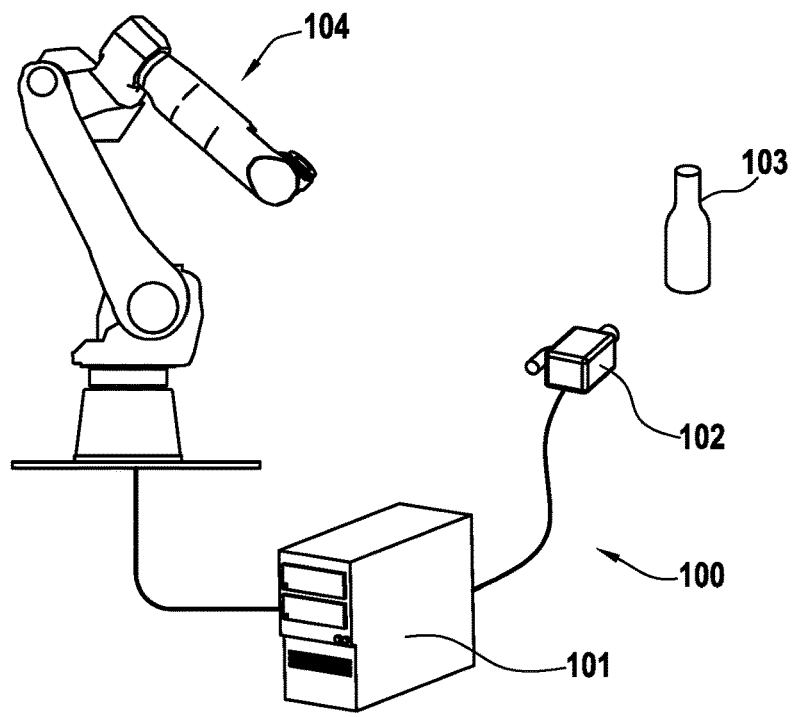
FIG. 1 illustrates schematically a robotic application.

While the present disclosure is amenable to various modifications and alternative forms, specifics thereof have been shown by way of example in the drawings and will be described in detail. It should be understood, however, that the intention is not to limit aspects of the present disclosure to the particular embodiments described. On the contrary, the intention is to cover all modifications, equivalents, and alternatives falling within the scope of the present disclosure.

DETAILED DESCRIPTION

For the following defined terms, these definitions shall be applied, unless a different definition is given in the claims or elsewhere in this specification.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the present disclosure. The illustrative embodiments depicted are intended only as exemplary. Selected features of any illustrative embodiment may be incorporated into an additional embodiment unless clearly stated to the contrary.

Figure 2:
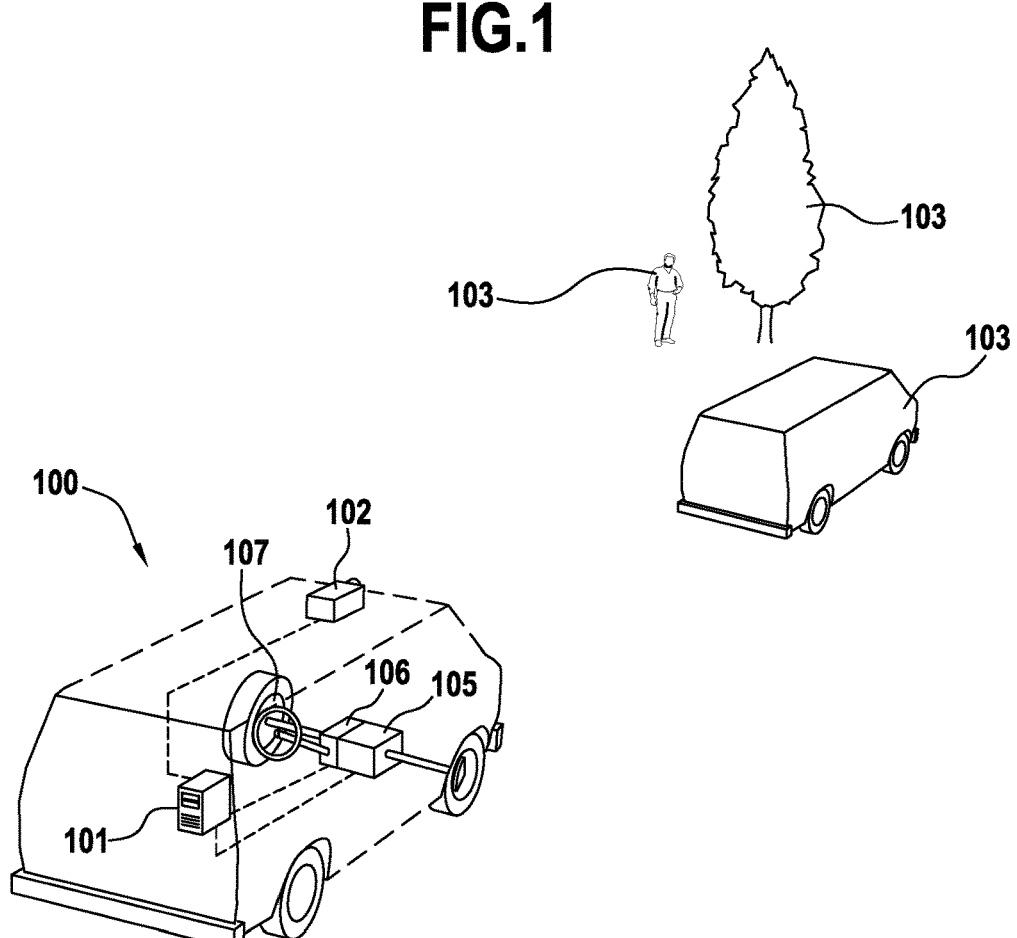
FIG. 2 illustrates schematically an autonomous driving application.

As illustrated in FIGS. 1 and 2, a system 100 may comprise a data processing device 101 and an imaging device 102. The imaging device 102 may be a camera configured to capture 2D images, and more particularly a color camera, which may be configure to capture each 2D image as a RGB pixel array with an intensity value for each one of three colors (red, green and blue) for each pixel. The imaging device 102 may be further connected to the data processor device 101 for inputting these 2D images to the data processing device 101. The data processing device 101 may be a computer programmed to estimate 3D position, orientation and shape of one or more objects 103 from a 2D image captured by the imaging device 102.

As in the example shown in FIG. 1, the system 100 may further comprise a robotic manipulator 104 connected to the data processing device 101, which may further be programmed to control the robotic manipulator 104 according to the estimated 3D position, orientation and shape of one or more objects 103, for example for handling those objects 103 and/or working on them.

Alternatively or additionally, however, the system 100 may be a vehicle, as illustrated in FIG. 2, further comprising propulsion, steering and/or braking devices 105, 106 and 107, and the data processing device 101 may be programmed to control and/or assist control of the propulsion, steering and/or braking devices 105, 106 and 107 according to the estimated 3D position, orientation and shape of one or more objects 103, for example for collision prevention in autonomous driving or driving assistance.

Figure 3:
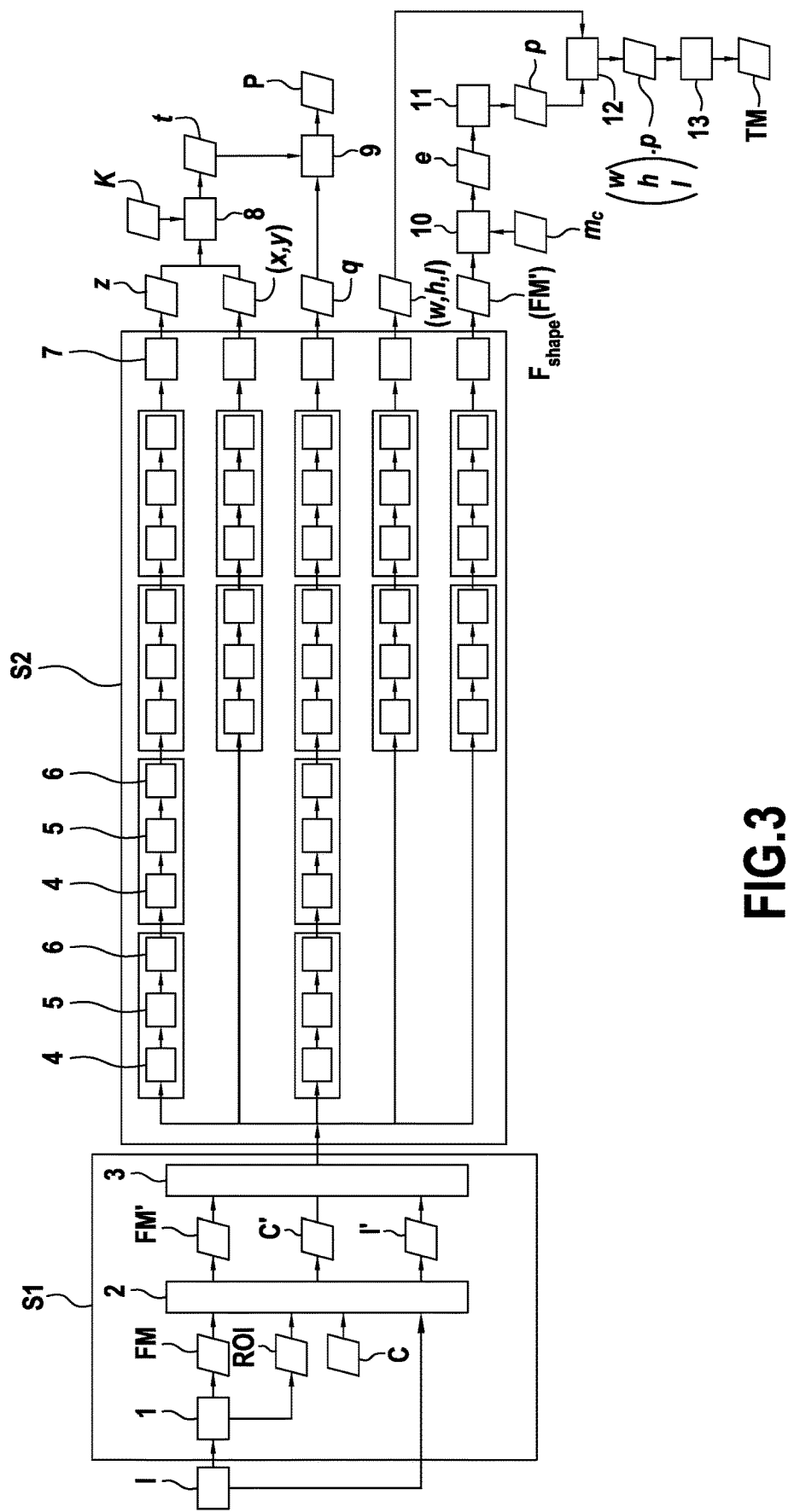
FIG. 3 illustrates schematically a 6D pose and shape estimating method.
Figure 4:
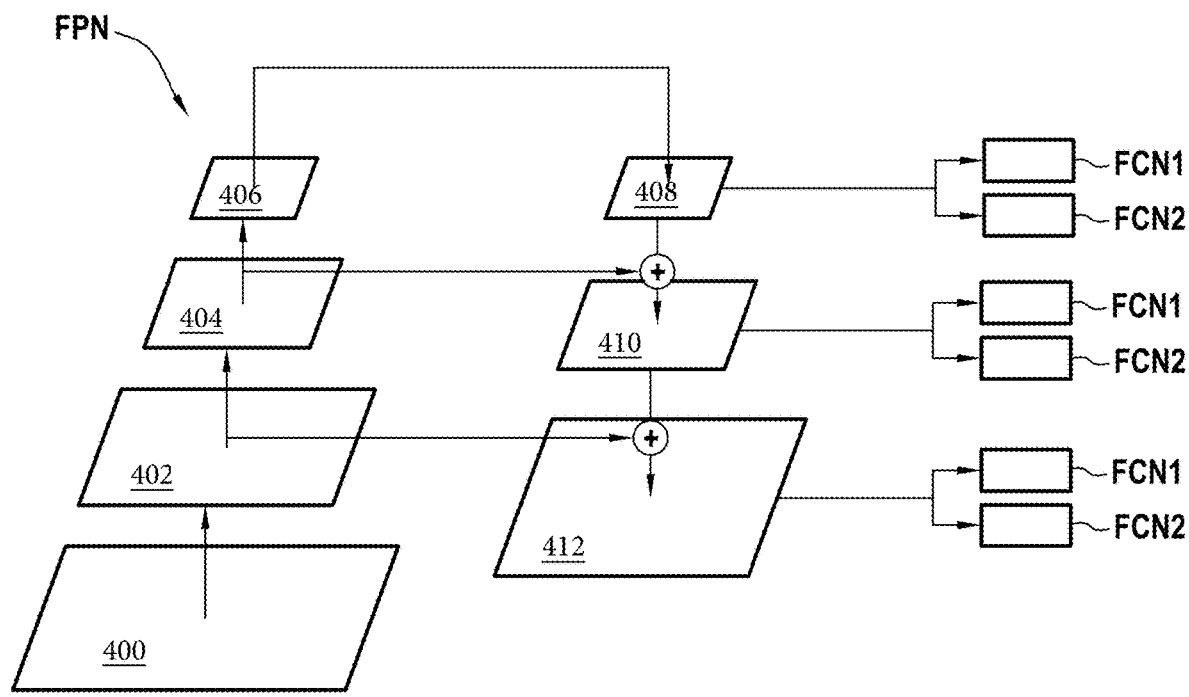
FIG. 4 illustrates schematically a step of detecting regions of interest in an image.

In either case, the data processing device 101 may be programmed to estimate the 3D position, orientation and shape of each object 103 according to the method illustrated in FIG. 3. In a detection step 1 of a first stage S1 of this method, the data processing device 101 may compute a feature map FM of the 2D image received from the imaging device 102, as well as, for each object 103 within the 2D image I, a 2D region of interest ROI containing the corresponding object 103. This may be carried out, as illustrated in FIG. 4, using a feature pyramid network FPN with first and second fully-convolutional networks FCN1, FCN2 attached to each level of the feature pyramid network FPN, as for example in the RetinaNet detector described by Lin et al in "Focal Loss for Dense Object Detection", arXiv: 1708.02002v2. The feature pyramid network FPN includes layers 400, 402, 404, 406, 408, 410, and 412. The first fully-convolutional networks FCN1 may be used for classifying each 2D region of interest, and the second fully-convolutional networks FCN2 for regressing a boundary of each 2D region of interest towards the corresponding object 103.

For each 2D region of interest ROI, a corresponding cropped pixel value array I', cropped coordinate tensor C', and cropped feature map FM' may then be cropped out from, respectively, the 2D image I, a coordinate tensor C for the whole 2D image I, and the feature map FM, using for example an ROI align operator. The coordinate tensor C may have two channels where each pixel is filled with corresponding coordinates, as described by Liu et al in "An intriguing failing of convolutional neural networks and the coordconv solution", NeurIPS, 2018. The cropped coordinate tensor C' thus contains the location of the crop so that the global context is not lost. The cropped pixel value array I', cropped coordinate tensor C', and cropped feature map FM' for each region of interest may then concatenated in a concatenation step 3, before being inputted to a predictor in a second stage S2.

Figure 5:
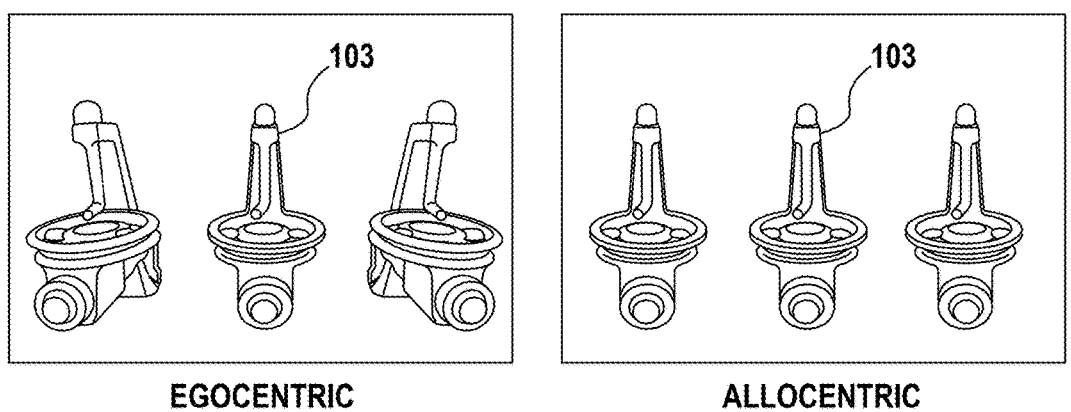
FIG. 5 illustrates egocentric and allocentric projections of an object translated across an image plane.

The predictor of this second stage S2 may infer a 4D quaternion q describing a rotation of the corresponding object in the 3D rotation group SO(3) projected in the allocentric space, a 2D centroid (x,y), which is a projection of a 3D translation of the corresponding object onto a plane of the 2D image I given a camera matrix K associated to the imaging device 102, a distance z from a viewpoint of the 2D image to the corresponding object, a metric size (w,h,l), and a class-specific latent shape vector $F_{Shape}(FM')$ of the corresponding object 103. The class-specific latent shape vector $F_{Shape}(FM')$ may represent an offset of the shape of the corresponding object 103 from a mean latent shape representation $m_c$ of a corresponding object class c. Since this information is inferred from a cropped region of interest ROI, the allocentric representation is favored for the 4D quaternion q as it is viewpoint invariant under 3D translation of the corresponding object 103, as shown in FIG. 5, comparing the changing appearance of such an object 103 under egocentric representation when subject to a 3D translation lateral to an image plane to the unchanging appearance of the same object 103 under allocentric representation when subject to the same 3D translation.

This predictor may have separate branches for inferring each of the 4D quaternion q, 2D centroid (x,y), distance z, size (w,h,l), and class-specific latent shape vector $F_{Shape}$ (FM), each branch representing an artificial neural network containing successive 2D convolutions 4 followed each by a batch norm layer 5 and a Rectified Linear Unit activation layer 6, and ending with a fully connected layer 7. Since features from the feature pyramid network FPN in the first stage S1 are forwarded, within the cropped feature maps FM', to the second, predictor stage S2, a relatively small number of layers may be used for these inferences. Using separate lifting modules for each object class may thus not require excessive processing. This further improves performance since 6D poses and scaled shapes from different classes do not interfere during optimization. As shown in FIG. 3, the branches for inferring the 4D quaternion q and the distance z may comprise more layers than the rest, for example four successive 2D convolutions 4 followed each by a batch norm layer 5 and a Rectified Linear Unit activation layer 6, as opposed to just two for the rest. However, smaller numbers of layers may be envisaged for each branch.

The 2D centroid (x,y) may be back projected into 3D space using, in a back projecting step 8, the distance z and the camera matrix K, so as to obtain a 3D translation t of the corresponding object 103 with respect to the viewpoint of the imaging device 102. In an egocentric projection computing step 9, the egocentric projection P of the corresponding object 103 with respect to the viewpoint and orientation of the imaging device 102 may be computed from the 3D translation t and the 4D quaternion q describing the rotation in the allocentric space, thus finally obtaining the 6D pose of the corresponding object 103 with respect to the imaging device 102.

The class-specific latent shape vector $F_{Shape}$(FM) inferred for the corresponding object may be applied in an adding step 10 to the mean latent shape representation $m_c$ associated to the corresponding object class, to obtain a shape encoding e of the corresponding object. In a decoding step 11, a decoder neural network $D_c$ for that object class c may be used to reconstruct an unscaled 3D point cloud p, according to the equation:

$$p=D_c(e)$$

This unscaled 3D point cloud p may then brought to scale in scaling step 12, using the inferred size (w,h,l) of the corresponding object 103 to obtain a scaled 3D point cloud (w,h,l)·p.

Figure 6:
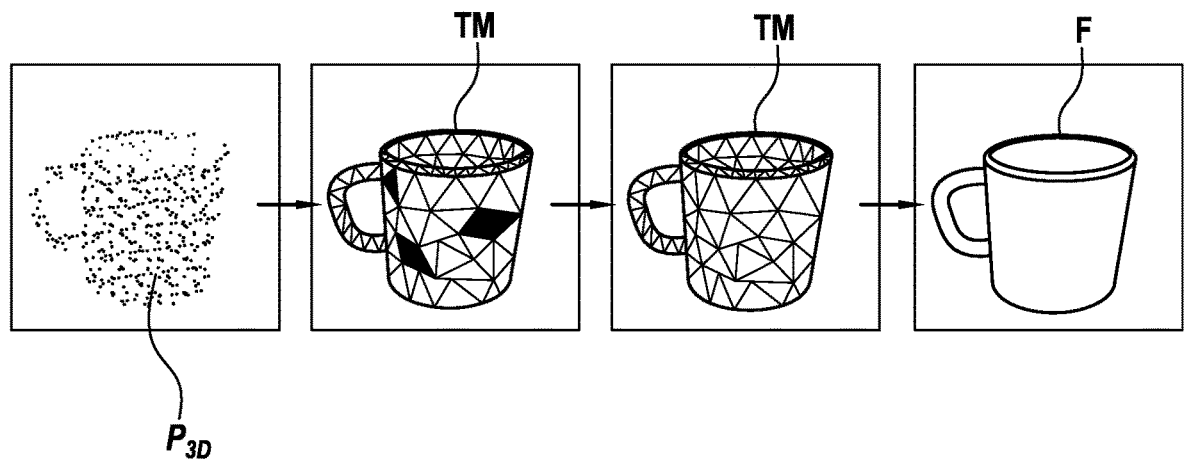
FIG. 6 illustrates a meshing and smoothing step performed on a point cloud representing a 3D shape.

In a meshing step 13, a metric triangle mesh TM may then be generated based on the scaled 3D point cloud (w,h,l)·p, as shown in FIG. 6. A ball pivoting algorithm may then be used in a next step to merge mesh triangles of the triangle mesh so as to fill any remaining holes in the triangle mesh TM. Finally, in another step, a Laplacian filter may be applied to the triangle mesh TM to generate a smoothed metric 3D shape F of the corresponding object 103, providing a realistic representation for example for augmented reality applications.

The artificial neural networks may be jointly trained to infer shape and pose. For this, a low-dimensional latent space representation $S_c$ of each object class c may be learned, which is a set of all latent space representations $s_c$ of training shapes associated to that object class c. During inference, this allows for reconstruction of a 3D model by predicting just a few shape parameters, thus improving generalization. A method may be used, such as e.g. the AtlasNet method disclosed by T. Groueix et al in "AtlasNet: A Papier-Mâché Approach to Learning 3D Surface Generation", CVPR 2018, may be used to learn this latent space representation $S_c$ of an object class c by taking as input a complete point cloud and encoding it into a global shape descriptor. A 3D shape can then be reconstructed by concatenating that descriptor with points sampled from a 2D uv-map and feeding the result to a decoder network. This approach decouples the number of predicted points from that in the original training shapes, thus enabling the reconstruction of shapes with arbitrary resolution. One such auto-encoder and decoder network may be trained separately for each object class on a dataset of 3D shapes, such as for example a subset of the ShapeNet repository described by A. X. Chang et al in "An information-rich 3D model repository", arXiv:1512.03012, 2015. Each auto-encoder and decoder network may thus learn a class-specific distribution of valid shapes in latent space.

The latent space representation $S_c$ of each object class c can thus be computed using the encoder part $E_c$ of the auto-encoder and decoder network. The mean latent shape representation $m_c$ for each object class may then be computed as follows:

$$m_c = \frac{1}{|S_c|} \sum_{\forall s_c \in S_c} s_c$$

The decoder part $D_c$ of the trained auto-encoder and decoder network may then be frozen to be used as the decoder neural network for reconstructing the unscaled 3D point cloud p in the pose and shape estimation method described above.

To encourage the predictions to stay inside of the learnt shape distribution, a shape regularization loss may be employed. That is, assuming the training's per-class shape encodings s, span a convex shape space $S_c$, the decoder neural network may be punished for any predicted shape encoding e outside of the shape space $S_c$, and such outlying predictions be projected onto the boundary $S_c$ of the shape space $S_c$. In practice, all predicted shape encodings e may be detected by considering that $e \in S_c$ if:

$$\min_{\forall s_{c,i}, s_{c,j} \in S_c, i \neq j} \left( (e - s_{c,i})^T (e - s_{c,j}) \right) \leq 0$$

It may thus be checked whether there are two vectors in the embedding which enclose the predicted shape encoding e. These may then be projected on the line connecting the two closest training shape encodings $s_{c,1}$, $s_{c,2}$ within the shape space $S_c$. These two training shape encodings $s_{c,1}$, $s_{c,2}$ may be retrieved by computing the Euclidean distance for the regressed encodings with all elements of $S_c$ and taking the two elements with the smallest distance. The error then amounts to the length of the projection $\pi(e|s_{c,1}, s_{c,2})$, according to the equation:

$$\pi(e|s_{c,1}, s_{c,2}) = (s_{c,1} - e) - \frac{(s_{c,1} - e)^T (s_{c,2} - e)}{(s_{c,2} - e)^T (s_{c,2} - e)} (S_{c,2} - e)$$

The final loss $L_{reg}$ for one sample shape encoding e then amounts to:

$$L_{reg}(e|S_c, s_{c,1}, s_{c,2}) = \begin{cases} 0, & \text{if } e \in S_c \\ \|\pi(e|s_{c,1}, s_{c,2})\|_2, & \text{otherwise} \end{cases}$$

The regressed 3D shape may be directly aligned with the scene in fully differential manner. Provided the 6D pose as 4D quaternion q and 3D translation t, together with the unscaled 3D point cloud p and the size (w,h,l), the scaled shape $P_{3D}$ may be computed and transformed to 3D at the corresponding pose, using the camera matrix K, according to the formula:

$$p_{3D} = q \cdot \left( \begin{pmatrix} w \\ h \\ l \end{pmatrix} \cdot p \right) \cdot q^{-1} + K^{-1} \begin{pmatrix} x \cdot z \\ y \cdot z \\ z \end{pmatrix}$$

Figure 7:
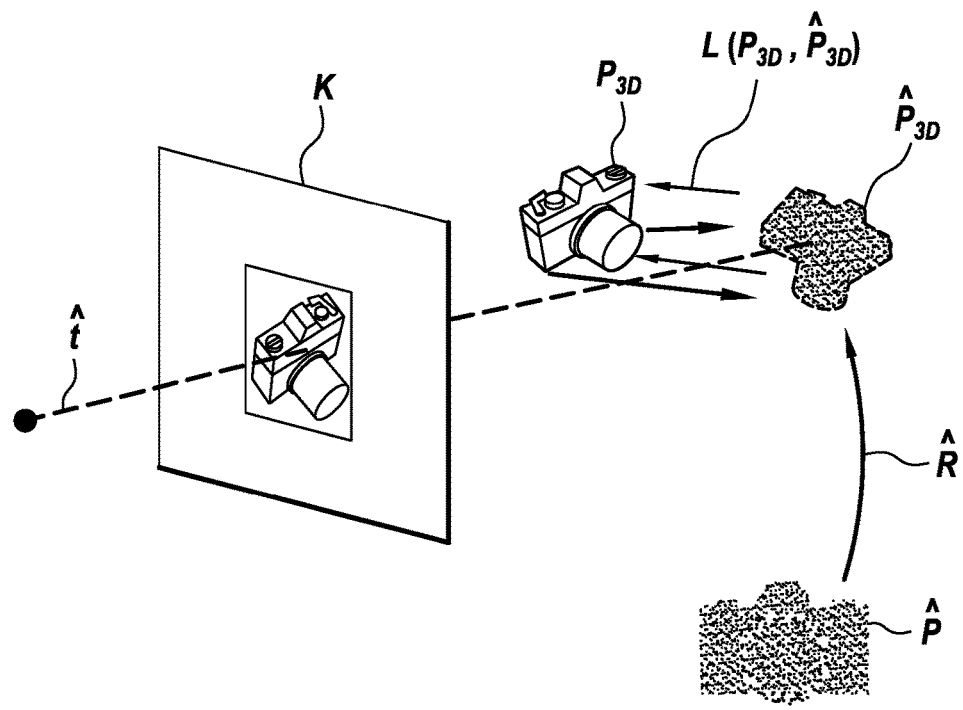
FIG. 7 illustrates a learning step in which an estimated 6D pose and shape is compared to a ground truth point cloud.

The alignment may then be simply measured, using a chamfer distance as shown in FIG. 7, against a point cloud $\hat{p}_{3D}$ representing the ground truth, which may for instance be computed by uniformly sampling a plurality of points, for example 2048 points, from a CAD model on whose basis the learning is being carried out, to form a point cloud $\hat{p}$, and then applying to it the rotation $\hat{R}$ and translation $\hat{t}$ corresponding to its 6D pose in the learning scene, according to the formula:

$$\hat{p}_{3D} = \hat{R}\hat{p} + \hat{t}$$

Eventually, the final loss L can be calculated as:

$$L(p_{3D}, \hat{p}_{3D}) := \frac{1}{|p_{3D}|} \sum_{v \in p_{3D}} \min_{\hat{v} \in \hat{p}_{3D}} \|v - \hat{v}\|_2 + \frac{1}{|\hat{p}_{3D}|} \sum_{\hat{v} \in \hat{p}_{3D}} \min_{v \in p_{3D}} \|v - \hat{v}\|_2$$

wherein v and $\hat{v}$ denote, respectively, vertices of the point clouds $p_{3D}$ and $\hat{p}_{3D}$.

Since applying the chamfer distance directly may turn out to be unstable due to local minima, a warm-up training may first be carried out in which an $L_1$-norm between each component and the ground truth is computed, using for example the method disclosed by A. Kendall et al in "Multi-task learning using uncertainty to weigh losses for scene geometry and semantics", CVPR, 2018, to weight the different terms. Additionally, the predictions may be disentangled and the 3D Point Cloud Loss computed separately for each parameter.

Those skilled in the art will recognize that the present disclosure may be manifested in a variety of forms other than the specific embodiments described and contemplated herein. For example, the described 6D pose and shape estimating method may be applied over a sequence of successive 2D images I, estimating 3D position, orientation and shape of the one or more objects 103 from each 2D image I of the sequence of successive 2D images, in order to track the one or more objects over the sequence of successive 2D images. Accordingly, departure in form and detail may be made without departing from the scope of the present disclosure as described in the appended claims.

The invention claimed is:

1. A computer-implemented method of estimating 3D position, orientation and shape of one or more objects, the method comprising:
   capturing, with an imaging device, a 2D image of the one or more objects;
   detecting, within the 2D image, one or more 2D regions of interest, each 2D region of interest containing a corresponding object among the one or more objects;
   cropping out a corresponding pixel value array, coordinate tensor, and feature map for each 2D region of interest;
   concatenating the corresponding pixel value array, coordinate tensor, and feature map for each 2D region of interest;
   inferring, for each 2D region of interest, a 4D quaternion describing a rotation of the corresponding object in the 3D rotation group, a 2D centroid, which is a projection of a 3D translation of the corresponding object onto a plane of the 2D image given a camera matrix associated to the 2D image, a distance from a viewpoint of the 2D image to the corresponding object, a size, and a class-specific latent shape vector of the corresponding object which represents an offset from a mean latent shape representation of a corresponding object class; and
   adding the class-specific latent shape vector to the mean latent shape representation of the corresponding object class to obtain an absolute shape vector of the corresponding object.

2. The computer-implemented method according to claim 1, wherein the cropping out a corresponding pixel value array, coordinate tensor, and feature map for each 2D region of interest also comprises resizing them into a uniform array size.

3. The computer-implemented method according to claim 2, further comprising back projecting the 2D centroid using the distance from the viewpoint and the camera matrix to compute the 3D translation.

4. The computer-implemented method according to claim 3, wherein the 4D quaternion describes the rotation in an allocentric projection space and the method further comprises computing an egocentric projection using the 4D quaternion and the 3D translation.

5. The computer-implemented method according to claim 1, comprising reconstructing an unscaled 3D point cloud, from the absolute shape vector, using a separately trained decoder neural network.

6. The computer-implemented method according to claim 1, further comprising scaling the unscaled 3D point cloud, using the inferred size, to obtain a scaled 3D point cloud of the corresponding object.

7. The computer-implemented method according to claim 6, wherein method further comprises meshing the scaled 3D point cloud to generate a triangle mesh of the scaled 3D shape.

8. The computer-implemented method according to claim 7, wherein the method further comprises merging mesh triangles of the triangle mesh, using a ball pivoting algorithm, to fill any remaining hole in the triangle mesh.

9. The computer-implemented method according to claim 8, wherein the method further comprises applying a Laplacian filter to the triangle mesh to generate a smoothed scaled 3D shape (M) of the corresponding object.

10. The computer-implemented method according to claim 1, wherein the one or more 2D regions of interest are detected within the 2D image using a feature pyramid network.

11. The computer-implemented method according to claim 10, further comprising a step of classifying each 2D region of interest using a fully convolutional neural network attached to each level of the feature pyramid network.

12. The computer-implemented method according to claim 11, further comprising a step of regressing a boundary of each 2D region of interest towards the corresponding object using another fully convolutional neural network attached to each level of the feature pyramid network.

13. The computer-implemented method according to claim 1, wherein the step of inferring, for each 2D region of interest, the 4D quaternion, 2D centroid, distance, size, and class-specific latent shape vector of the corresponding object is carried out using a separate neural network for each one of the 4D quaternion, 2D centroid, distance, size, and class-specific latent shape vector.

14. The computer-implemented method according to claim 13, wherein each separate neural network for inferring the 4D quaternion, 2D centroid, distance, size, and class-specific latent shape vector comprises multiple 2D convolution layers, each followed by a batch normalization layer and a rectified linear unit activation layer, and a fully-connected layer at the end of the separate neural network.

15. The computer-implemented method according to claim 14, wherein each one of the separate neural networks for inferring the 4D quaternion and distance comprises four 2D convolution layers followed each by a batch normalization layer and a rectified linear unit activation layer, whereas each one of the separate neural networks for inferring the 2D centroid, size, and class-specific latent shape vector comprises only two 2D convolution layers followed each by a batch normalization layer and a rectified linear unit activation layer.

16. The computer-implemented method according to claim 1, wherein the 2D image is in the form of a pixel array with at least one value for each pixel.

17. The computer-implemented method according to claim 16, wherein the pixel array has an intensity value for each of three colors for each pixel.

18. A system comprising a data processing device programmed to estimate 3D position, orientation and shape of one or more objects from a 2D image, and an imaging device connected to input the 2D image to the data processing device, wherein the data processing device is further programmed to:

detect, within the 2D image, one or more 2D regions of interest, each 2D region of interest containing a corresponding object among the one of more objects;

crop out a corresponding pixel value array, coordinate tensor, and feature map for each 2D region of interest;

concatenate the corresponding pixel value array, coordinate tensor, and feature map for each 2D region of interest;

infer, for each 2D region of interest, a 4D quaternion describing a rotation of the corresponding object in the 3D rotation group, a 2D centroid, which is a projection of a 3D translation of the corresponding object onto a plane of the 2D image given a camera matrix associated to the 2D image, a distance from a viewpoint of the 2D image to the corresponding object, a size, and a class-specific latent shape vector of the corresponding object which represents an offset from a mean latent shape representation of a corresponding object class; and add the class-specific latent shape vector to the mean latent shape representation of the corresponding object class to obtain an absolute shape vector of the corresponding object.

19. The system of claim 18, further comprising a robotic manipulator connected to the data processing device, wherein the data processing device is also programmed to control the manipulator based on the estimated 3D position, orientation and shape of each object in the 2D image.

20. The system of claim 18, further comprising propulsion, steering and/or braking devices, wherein the data processing device is also programmed to control and/or assist control of the propulsion, steering and/or braking devices based on the estimated 3D position, orientation and shape of each object in the 2D image.

* * * * *